2,917,496

COPOLYMER OF A FLUORO-BUTADIENE AND AN ACRYLIC COMONOMER AND PROCESS OF MAKING SAME

Francis J. Honn, Westfield, N.J., assignor, by mesne assignments, to Minnesota Mining and Manufacturing Company, St. Paul, Minn., a corporation of Delaware No Drawing. Application October 20, 1954
Serial No. 463,590

7 Claims. (Cl. 260—85.5)

This invention relates to novel copolymers of fluorinated dienes, containing at least 2 fluorine atoms, with acrylic comonomers.

The synthetic rubber-like substances possess wide utility as a group serving not only as substitutes for natural rubber, but in some cases, the properties of the individual compositions are superior to the natural product, e.g., in oil resistance and aging characteristics.

In accordance with the present invention, copolymers of fluorinated dienes, which are preferably fluorinated butadienes containing at least 2 fluorine atoms, are produced by copolymerizing the fluorinated diene with an acrylic comonomer to produce copolymers which may be used in applications requiring thermal stability and chemical resistance, particularly oil and fuel resistance. The copolymers possess good resinous or elastomeric properties, depending upon the composition of the individual copolymers. The raw polymers can be pressed into flexible sheets of varying thickness at temperatures up to about 450° F.

The elastomeric polymers are particularly well adapted for use in the manufacture of protective articles of clothing and footwear such as boots, suits, gloves, and helmets and also in the manufacture of resilient gaskets, seals, pump packings, hose, cable jackets, pump and valve diaphragms, and other articles which are used in applications requiring exposure to oils and fuels. The more tacky copolymers are also useful as adhesives having good chemical resistance. Generally, the polymers are useful as protective coatings on fabrics and metal or other hard surfaces.

The fluorinated butadienes which are preferably employed as monomers in the process of the invention to produce the desired copolymers have the formula

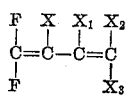

in which X and $X_1$ may be hydrogen, fluorine or alkyl radicals, the alkyl radicals having from 1 to 3 carbon atoms, and $X_2$ and $X_3$ may be hydrogen or fluorine. Exemplary of the fluorobutadienes contemplated are 1,1,3-trifluorobutadiene, 1,1-difluoro-2-methyl butadiene, 1,1-difluorobutadiene, 1,1-difluoro-3-methyl butadiene, 1,1,2-trifluorobutadiene, 1,1,3-trifluoro-2-methyl-1,3-butadiene, 1,1,2,4,4-pentafluoro-3-methyl butadiene, and perfluorobutadiene. Also contemplated are the corresponding ethyl and propyl substituted butadienes in which these alkyl groups may be substituted in the 2 and/or 3 positions.

Among the acrylic comonomers which are contemplated are acrylonitrile, acrylamide, and alkyl acrylates and alkyl methacrylates having 1 to 8 carbon atoms in the alkyl radical, including methyl, ethyl, propyl, butyl, and amyl acrylates, and the corresponding alkyl methacrylates, such as the methyl, ethyl, propyl, butyl, amyl, and other alkyl methacrylates having from 1 to 8 carbon atoms in the alkyl group. Also included are halogenated derivatives, such as methyl alpha-chloroacrylate and methyl alpha-fluoroacrylate.

The physical nature of the copolymers of the invention range from rigid resinous thermoplastics to tough hard rubber-like materials including very elastic and extensible materials which are vulcanized and processed easily. Although the copolymers of the invention may contain from about 1 to about 99 mole percent of the fluorobutadiene, depending upon the particular fluorobutadiene which is charged to the reaction zone, it is preferable to have at least 5 mole percent of the fluorobutadiene present in order to obtain copolymers with good chemical and fuel resistance and thermal stability. The presence of small amounts, namely, from 1 to about 5 mole percent, of the acrylic comonomer in the polymer product is sufficient to alter the physical nature of the fluorobutadiene polymer. For example, the homopolymer of 1,1-difluorobutadiene is a thermoplastic material, whereas a copolymer of 1,1-difluorobutadiene containing only 3 mole percent of n-butyl acrylate is a tough snappy rubber.

With the exception of perfluorobutadiene, it has been found that in general the fluorobutadiene monomers of this invention polymerize at a somewhat faster rate, and in some cases, at a considerably faster rate, than do the derivatives of the acrylate acids. It also has been found that as the mole percent of the fluorobutadiene is increased with respect to the mole percent of acrylic acid derivative in the monomer charge, the higher will be the mole percent of the fluorobutadiene incorporated into the copolymer produced by the method described herein.

The polymerizations may be conducted under autogenous conditions of pressure, i.e. 50 to 250 p.s.i.g., or at relatively low pressures, or the polymerization system may be pressured to higher presures of the order of 1000 p.s.i.g. and higher. The use of these relatively high pressures is recommended for copolymerizations involving perfluorobutadiene in particular.

The reaction time may vary between about 2 and 72 hours, although shorter and longer reaction times are also satisfactory.

The copolymers of the invention may be prepared in various comonomer ratios, as previously described, and by employing the various conventional polymerization recipes. Temperatures employed in the copolymerization reaction may be between about 0° C. and 100° C. with the preferred temperature range being between about 5 and 60° C. The copolymers of this invention are prepared by employing one of a number of free radical promoted polymerization systems. Peroxy type polymerization promoters have been found to be suitable in initiating the desired polymerization reactions and are used in suspension, emulsion, or mass polymerization systems, Of the water suspension type catalyst systems which may be employed, a redox catalyst system is preferred, which comprises an oxidant and a reductant. The oxidant in the water suspension type recipe is preferably an inorganic persulfate, such as potassium persulfate, sodium persulfate, or ammonium persulfate. The reductant is preferably a bisulfite, such as potassium bisulfite, sodium bisulfite, potassium metabisulfite, or sodium metabisulfite. The oxidant in the suspension redox recipe comprises between about 0.1 and 5 parts by weight, per 100 parts of total comonomers present, and preferably comprises between about 0.5 and 2 parts by weight, per 100 parts of total comonomers present. The reductant, for example sodium metabisulfite, may comprise between about 0.05 and about 5.0 parts by weight, per 100 parts of total comonomers present, and preferably comprises between about 0.1 and about 2 parts by weight, per 100 parts of total comonomers present. A compound such as sodium tetraborate may also be employed, if desired, together with the oxidant and reductant.

Also, about 0.01 to about 1 part by weight, per 100 parts of total comonomers present, of a variable valence metal salt may be employed. The variable valence metal salt is preferably an iron salt, such as ferrous sulfate or ferrous nitrate. When producing the copolymers of the invention in the persulfate-bisulfite suspension system, it is preferable to operate at a temperature range of about 25° C. to about 60° C., but lower temperatures, i.e., between about 5° C. and about 25° C., are desirably employed when a variable valence metal salt is present in the polymerization system. Also, the reductant and variable valence metal salt may be eliminated, if desired, and a water suspension recipe may be employed which contains only the oxidant.

Alternatively, an emulsion catalyst system, containing water, soap, and a peroxy compound, may also be employed. The different types of emulsion systems may be conveniently differentiated on the basis of the catalyst system employed to initiate the polymerization. One type is that in which the polymerization is initiated by employing a redox catalyst system, comprising between about 0.01 to about 1 part by weight, per 100 parts of total comonomers present, of an organic oxidant and an activator solution. Exemplary of the organic oxidants which may be used in the emulsion catalyst system are cumene hydroperoxide, diisopropylbenzene hydroperoxide, tertiary-butyl-isopropylbenzene hydroperoxide, triisopropylbenzene hydroperoxide, methylcyclohexane hydroperoxide, tertiary-butyl perbenzoate, and tertiary-butyl hydroperoxide. A typical activator solution may consist of about 0.01 to 1.0 part by weight, per 100 parts of total comonomers present, of a variable valence metal salt, for example ferrous sulfate, about 0.1 to 10.0 parts by weight of sodium pyrophosphate, and about 0.1 to 10.0 parts by weight of a reducing sugar, such as dextrose, fructose, or levulose.

Another type of emulsion catalyst system is that which comprises about 0.05 to 5 parts by weight, per 100 parts of total comonomers present, of a persulfate as the oxidant, and which preferably comprises between about 0.1 and about 0.5 part by weight of any of the persulfates previously mentioned as being suitable for use in aqueous suspension systems.

The soap employed as the emulsifying agent in either the redox or persulfate emulsion catalyst systems is preferably a metal salt, such as the potassium or sodium salts, derived from saturated aliphatic acids, the optimum chain length of the acid being between about 14 and about 20 carbon atoms, or from polyfluorocarboxylic acids or perfluorochlorocarboxylic acids. The polyfluorocarboxylic acids which may be used are those disclosed in U.S. Patent 2,559,752, and the derivatives of the acids disclosed therein as being efficacious dispersing agents in polymerization reactions may also be employed in the process of the present invention. The perfluorochlorocarboxylic acids which may be used in the process of the present invention are those disclosed in copending application Serial No. 463,073, filed October 18, 1954, now Patent No. 2,874,152, as being useful as dispersing agents in polymerization reactions. The soap is generally present in a quantity between about 0.5 and about 10 parts by weight per 100 parts of total comonomers present. The emulsion polymerization is desirably conducted under alkaline conditions and the pH should be maintained between about 9 and 11 in order to prevent gelling of the soap. The pH may be adjusted, if desired, by the addition of suitable buffers.

Of the organic peroxide promoters which may be employed in the mass polymerization system, substituted acetyl peroxides, such as trichloroacetyl peroxide, are preferred. Other suitable organic peroxides are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

Polymerization modifiers may also be employed to reduce the molecular weight of the copolymer products and thereby increase the solubility and ease of processing thereof. Exemplary of such modifiers are chloroform, carbon tetrachloride, trichloroacetyl chloride, bromotrichloromethane, and dodecyl mercaptan. These modifiers are generally added in quantities between about 0.1 to 10 parts by weight per 100 parts of total comonomers charged. Dodecyl mercaptan is the preferred modifier due to the unusual efficacy which it possesses for this purpose.

The invention will be further illustrated by reference to the following specific examples in which all parts are by weight:

EXAMPLE 1

A charge was prepared according to the following recipe:

|  | Parts by weight |
|---|---|
| Water, de-ionized | 200.0 |
| Total monomers | 100.0 |
| Soap | 5.0 |
| Potassium persulfate ($K_2S_2O_8$) | 0.3 |
| Dodecyl mercaptan | 0.3 |

These ingredients were charged to glass polymerization tubes as follows, freezing the tubes at the temperature of liquid nitrogen after each addition:

(1) 180 parts of soap solution, prepared by dissolving 5.0 parts of potassium fatty acid soap in 180 parts of deionized water by agitating and heating the mixture at a temperature not exceeding 50° C. When solution was complete, the mixture was cooled to a temperature of 22° C. and the pH was adjusted to 10.2; 0.3 part of tertiary dodecyl mercaptan was added and the resulting mixture was agitated and then frozen solid in a freezing bath consisting of a slush of solid carbon dioxide and trichloroethylene, (2) 20.0 parts of a 1.5 percent solution of potassium persulfate, and (3) 100 parts of monomers, the parts by weight of each monomer added being given in Table 1 below.

The glass polymerization tubes were sealed in vacuo at the temperature of liquid nitrogen, placed in a water bath maintained at a temperature of 50° C. and the contents were shaken for a period of 24 hours. At the end of this period, the tubes were frozen at the temperature of liquid nitrogen to reduce the vapor pressure resulting from unreacted monomers and to coagulate the polymer at the same time. The contents of the tubes were then removed and washed with distilled water until free of soap. The washed contents were then dried to constant weight in vacuo at a temperature of 35° C.

The results are as follows:

Table I

| Ex. | Monomer 1 | Monomer 2 | Charge (Molar) $M_1/M_2$ | Charge (Pts. by Wt.) $M_1/M_2$ | Composition of Copolymer, Mole Percent $M_1$/Mole Percent $M_2$ | Percent Conversion | Appearance of Copolymer | Remarks |
|---|---|---|---|---|---|---|---|---|
| 1 | 1,1-difluorobutadiene | n-butyl acrylate | 50/50 | 41.2/58.8 | 97/3 | 68 | tough rubber | see Note 1. |
| 2 | 1,1-difluoro-2-methyl butadiene | ___do___ | 50/50 | 44.8/55.2 | 52/48 | 91 | snappy rubber | see Note 2. |
| 3 | 1,1-difluoro-3-methyl butadiene | ___do___ | 50/50 | 44.8/55.2 | 68/32 | 74 | ___do___ | see Note 3. |
| 4 | 1,1-difluorobutadiene | acrylamide | 50/50 | 55.8/44.2 | 47/53 | Ca. 100 | brittle solid | |
| 5 | 1,1-difluoro-2-methyl butadiene | ___do___ | 50/50 | 59.4/40.6 | 80/20 | 96 | hard resin | |
| 6 | 1,1-difluorobutadiene | acrylonitrile | 50/50 | 62.8/37.2 | 52/48 | 40 | tough thermoplastic | |
| 7 | 1,1-difluoro-2-methyl butadiene | ___do___ | 50/50 | 66.4/33.6 | 88/12 | 79 | stiff rubber | |
| 8 | 1,1-difluoro-3-methyl butadiene | ___do___ | 50/50 | 66.2/33.8 | 63/37 | 92 | tough rubber | see Note 4. |

NOTES

1. After molding a sample sheet of the raw copolymer while cold, the sample was soft and tacky.
2. The polymerization was run for 40 hours.
3. After molding a sample sheet of the raw copolymer at 225° F., the sample was soft and tacky.
4. The percent volume increase of the raw polymer as determined in ASTM Fuel, Type II, which consists of iso-octane (60% by volume), benzene (5%), toluene (20%) and xylene (15%) was only 3%.

EXAMPLE 2

A charge was prepared according to the following recipe:

Parts by weight
Water, deionized _____ 200.0
Total monomers _____ 100.0
Potassium persulfate _____ 1.0
Sodium metabisulfite _____ 0.4
Sodium tetraborate _____ 0.5
Ammonium perfluorocaprylate ($C_7F_{15}COONH_4$)-
  emulsifier _____ 6.0
Dodecyl mercaptan _____ 0.1

These ingredients were charged to glass polymerization tubes as follows, freezing the tubes in a solid carbon dioxide-acetone bath after each addition:

(1) 30 parts of a water solution containing 0.4 part of sodium metabisulfite and 0.5 part of sodium tetraborate, (2) 150 parts of a water solution containing 6 parts of ammonium perfluorocaprylate and 0.1 part of dodecyl mercaptan, (3) 20 parts of a water solution containing 1.0 parts of potassium persulfate, and (4) 100 parts of total monomers, the parts by weight of each monomer being given in Table II below.

The glass polymerization tubes were sealed in vacuo at the temperature of liquid nitrogen and were then shaken in a water bath, the temperature of which was automatically maintained at 50° C. At the end of 24 hours the tubes were frozen in a solid carbon dioxide-acetone bath, vented, and opened. The polymer was collected, washed several times with hot water, and dried to constant weight in a vacuum oven set at a temperature of 35° C.

The results are as follows:

EXAMPLE 3

A charge was prepared according to the following recipe:

Parts by weight
Water _____ 180.0
Total monomers _____ 100.0
Potassium persulfate _____ 1.0
Sodium metabisulfite _____ 0.4
Sodium tetraborate (borax) _____ 0.4
Ammonium perfluorocaprylate ($C_7F_{15}COONH_4$)-
  emulsifier _____ 6.0
Dodecyl mercaptan _____ 0.1
Buffer solution _____ 20.0

These ingredients were charged to a glass polymerization tube as before, freezing the tube after each addition:

(1) 30 parts of a water solution containing 0.4 part of sodium metabisulfite and 0.4 part of sodium tetraborate, (2) 130 parts of a soap solution containing 6 parts of ammonium perfluorocaprylate, and 0.1 part of dodecyl mercaptan, (3) 20 parts of a standard buffer solution, (4) 20 parts of a water solution containing 1.0 part of potassium persulfate, (5) 51.2 parts of freshly distilled n-butyl acrylate, and (6) 48.8 parts of 1,1,3-trifluoro-2-methyl-1,3-butadiene.

The glass polymerization tube was sealed in vacuo at the temperature of liquid nitrogen and was then rotated end-over-end in a water bath, the temperature of which was automatically controlled at 50° C. At the end of 23 hours, the tube was frozen in a solid carbon dioxide-acetone bath, vented, and opened. The polymer was collected, washed several times with hot water, and finally dried to constant weight in a vacuum Table II

| Ex. | Monomer 1 | Monomer 2 | Charge (Molar) $M_1/M_2$ | Charge (Pts. by Wt.) $M_1/M_2$ | Composition of Copolymer Mole Percent $M_1$/Mole Percent $M_2$ | Percent Conversion | Appearance of Copolymer | Remarks |
|---|---|---|---|---|---|---|---|---|
| 1 | 1,1-difluoro-3-methyl butadiene | acrylonitrile | 75/25 | 85.4/14.6 | 80/20 | 97 | rubbery | |
| 2 | ___do___ | ___do___ | 60/40 | 74.6/25.4 | 67.5/32.5 | 85 | hard rubber | see Note 1. |
| 3 | 1,1,3-trifluoro-2-methyl butadiene | ___do___ | 50/50 | 69.6/30.4 | 43/57 | 55 | ___do___ | |
| 4 | ___do___ | ___do___ | 75/25 | 87.4/12.6 | 65/35 | 71 | ___do___ | see Note 2. |
| 5 | 1,1,2-trifluorobutadiene | ___do___ | 50/50 | 67/33 | 57/43 | 94 | tough rubber | see Note 3. |

NOTES

1. The condition of a sample of the raw copolymer after molding at 400° F. was flexible.
2. The percent volume increase in ASTM Type II Fuel was only 1.8%. (After molding a sample of the raw copolymer at 250° F., the sample was a hard plastic.)
3. Percent volume increase in ASTM Type II Fuel was 7.5%. After molding at 385° F., the sample was firm and flexible.

oven set at a temperature of 35° C. A sticky copolymer product was obtained, which analysis showed to contain 39 mole percent of combined 1,1,3-trifluoro-2-methyl butadiene and 61 mole percent of combined n-butyl acrylate.

EXAMPLE 4

A charge, prepared according to the same recipe as that employed in Example 3 above, was charged to a glass polymerization tube using the same charging procedure, with the exception that the monomers employed were 73 parts of 1,1,3-trifluoro-2-methyl butadiene and 37 parts of acrylamide, representing a 50/50 molar charge of monomers. The polymerization was conducted as disclosed above in Example 3, and a tough thermoplastic product material was obtained in an amount representing a 13 percent by weight conversion, based upon the total weight of monomers charged, and which analyzed to show 65 mole percent of combined 1,1,3-trifluoro-2-methyl butadiene and 35 mole percent of combined acrylamide.

EXAMPLE 5

A charge was prepared according to the following recipe:

| | Parts by weight |
|---|---|
| Water | 200 |
| 1,1,3-trifluorobutadiene | [1] 67.2 |
| Acrylonitrile | [1] 32.8 |
| Potassium persulfate | 1.0 |
| Sodium metabisulfite | 0.4 |
| Sodium tetraborate | 0.5 |
| Soap | 5.0 |
| Dodecyl mercaptan | 0.2 |

[1] 50/50 molar.

A polymerization tube was charged with these ingredients, freezing the tube after each addition, as before:

(1) 30 parts of a water solution containing 0.4 part of sodium metabisulfite and 0.5 part of sodium tetraborate, (2) 150 parts of a water solution containing 5.0 parts of potassium fatty acid soap and 0.2 part of tertiary-dodecyl mercaptan, the pH of the soap solution being adjusted to 10.2, (3) 20 parts of a water solution containing 1.0 part of potassium persulfate, (4) 32.8 parts of freshly distilled acrylonitrile, and (5) 67.2 parts of 1,1,3-trifluorobutadiene.

The polymerization was conducted at a temperature of 50° C. for a period of 23 hours following the procedure disclosed in Example 3 above. The product was a resinous material obtained in a quantity equivalent to a 37 percent by weight conversion, based upon the total weight of monomers charged, and was, by analysis, shown to be a copolymer containing 40 mole percent of combined 1,1,3-trifluorobutadine and 60 mole percent of combined acrylonitrile.

EXAMPLE 6

A charge was prepared employing the following suspension catalyst system:

| | Parts by weight |
|---|---|
| Water | 200.0 |
| Total monomers | 100.0 |
| Ammonium persulfate (NH$_4$)$_2$S$_2$O$_8$ | 1.0 |
| Sodium metabisulfite Na$_2$S$_2$O$_5$ | 0.4 |
| Ferrous sulfate (FeSO$_4$·7H$_2$O) | 0.1 |

A glass polymerization tube was charged as follows, freezing the tube in a solid carbon dioxide-trichloroethylene slush after each addition:

(1) 120 parts of deionized water, (2) 20 parts of an aqueous solution containing 0.4 part of dissolved sodium metabisulfite, (3) 40 parts of an aqueous solution containing 1.0 part of dissolved ammonium persulfate, and (4) 20 parts of an aqueous solution containing 0.1 part of dissolved ferrous sulfate.

There were then added 44.2 parts of freshly distilled n-butyl acrylate, the tube was again frozen and finally evacuated while connected to a gas transfer system. Thereafter, 55.8 parts of perfluorobutadiene were flash distilled into the tube to make up a total monomer charge containing 50 mole percent of perfluorobutadiene. The mixture was then frozen, the tube was sealed, the temperature was raised to 20° C. and maintained for 68 hours while rotating the tube end-over-end. A rubbery polymeric product material was obtained in an amount representing a 42 percent by weight conversion, based upon the total weight of monomers charged, and by analysis was shown to contain 3.8 percent fluorine or 4 mole percent of combined perfluorobutadine, the remainder being n-butyl acrylate.

EXAMPLE 7

A charge prepared according to the same recipe as that employed in Example 5 above was charged to a glass polymerization tube using the same charging procedure with the exception that the monomers employed were 84.0 parts of 1,1,2,4,4-pentafluoro-3-methyl butadiene and 16.0 parts of acrylonitrile. The polymerization was conducted at a temperature of 50° C. for a period of 22 hours. The product was a relatively low molecular weight polymer obtained in a quantity equivalent to a 2.2 percent by weight conversion based upon the total weight of monomers charged.

EXAMPLE 8

A charge was prepared employing the following recipe:

| | Parts by weight |
|---|---|
| Water | 200.0 |
| Total monomers | 100.0 |
| Potassium persulfate | 1.0 |
| Cl(CF$_2$—CFCl)$_3$CF$_2$COOH | 0.75 |

A glass polymerization tube was charged as follows, freezing the tube in a solid carbon dioxide-acetone bath after each addition:

(1) 150 parts of deionized water containing 1 part of potassium persulfate, (2) 150 parts of water containing 0.75 part of Cl(CF$_2$—CFCl)$_3$CF$_2$COOH dissolved therein, (3) Sufficient potassium hydroxide to bring the pH to a value above 9, i.e., sufficient potassium hydroxide to insure that the pH of the total mixture is above 7, (4) 85.8 parts of 1,1,2-trifluorobutadiene, and (5) 14.2 parts of acrylonitrile. This charge is equivalent to a 75/25 molar ratio of monomers.

The polymerization was conducted at a temperature of 50° C. for a period of 24 hours following the general procedure of Example 3 above. The product was a short, hard rubber obtained in a quantity equivalent to a 71.3 percent by weight conversion, based upon the total weight of monomers charged, and was by analysis shown to be a copolymer containing 92.5 mole percent of combined 1,1,2-trifluorobutadiene and 7.5 mole percent of acrylonitrile.

EXAMPLE 9

A charge prepared according to the same recipe as that employed in Example 8 above was charged to a glass polymerization tube using the same charging procedure with the exception that the monomers used were 85.4 parts of 1,1-difluoro-2-methyl butadiene and 14.6 parts of acrylonitrile representing a 75/25 molar ratio of monomers. The polymerization was conducted as disclosed in Example 3 above, and the product was a tough, short rubber obtained in an amount representing a 97.8 percent by weight conversion based upon the total weight of monomers charged. The product was analyzed to show 68.5 mole percent of combined 1,1-difluoro-2-methyl butadiene and 31.5 mole percent of acrylonitrile.

EXAMPLE 10

A charge prepared according to the same recipe as that used in Example 8 above was charge to a glass polymerization tube using the same charging procedure with the exception that the monomers employed were 95 parts of 1,1-difluoro-2-methyl butadiene and 5 parts of acrylonitrile representing a 90/10 molar ratio of monomers. The polymerization was conducted as disclosed above in Example 3, and the product was a short rubber obtained in an amount representing a 26 percent by weight conversion based upon the total weight of monomers charged. The product was analyzed to show 97.5 mole percent of combined 1,1-difluoro-2-methyl butadiene and 2.5 mole percent of combined acrylonitrile.

It will be obvious to those skilled in the art that many modifications may be made within the scope of the present invention without departing from the spirit thereof, and the invention includes all such modifications.

I claim:

1. A copolymer of 1,1,2-trifluorobutadiene and acrylonitrile.
2. A copolymer of 1,1-difluoro-3-methyl butadiene and n-butyl acrylate.
3. A copolymer of 1,1-difluorobutadiene and acrylamide.
4. A copolymer of butadiene selected from the group consisting of 1,1-difluorobutadiene, 1,1-difluoro-2-methyl butadiene, 1,1-difluoro-3-methyl butadiene, perfluorobutadiene and 1,1,2-trifluorobutadiene, and an acrylic comonomer selected from the group consisting of acrylonitrile, acrylamide, alkyl acrylates and alkyl methacrylates having from 1 to 8 carbon atoms in the alkyl radical.
5. A copolymer of 1,1-difluoro-2-methyl butadiene and n-butyl acrylate.
6. A copolymer of 1,1-difluoro-3-methyl butadiene and acrylonitrile.
7. A process which comprises copolymerizing a butadiene selected from the group consisting of 1,1-difluoro-butadiene, 1,1-difluoro-2-methyl butadiene, 1,1-difluoro-3-methyl butadiene, perfluorobutadiene and 1,1,2-trifluoro-butadiene, and an acrylic comonomer selected from the group consisting of acrylonitrile, acrylamide, alkyl acrylates and alkyl methacrylates having from 1 to 8 carbon atoms in the alkyl radical, the process being carried out in a temperature range of from about 0° C. to about 100° C. in the presence of a free radical polymerization promoter.

References Cited in the file of this patent

UNITED STATES PATENTS

| | | |
|---|---|---|
| 2,429,838 | Mochel | Oct. 28, 1947 |
| 2,490,753 | Hill et al. | Dec. 6, 1949 |
| 2,647,110 | Wiseman | July 28, 1953 |
| 2,686,207 | Crane et al. | Aug. 10, 1954 |
| 2,694,701 | Blum et al. | Nov. 16, 1954 |
| 2,750,431 | Tarrant et al. | June 12, 1956 |